United States Patent [19]

McGuff et al.

[11] Patent Number: 5,611,170

[45] Date of Patent: Mar. 18, 1997

[54] TACKLE BOX HAVING BUILT IN LIGHT

[76] Inventors: John P. McGuff, 4909 W. 77th St., Prairie Village, Kans. 66208; William Bray, 7118 W. 85th St., Overland Park, Kans. 66212

[21] Appl. No.: 425,410

[22] Filed: Apr. 20, 1995

[51] Int. Cl.⁶ .......................... A01K 97/00; A01K 97/06
[52] U.S. Cl. .............................. 43/57.1; 43/54.1
[58] Field of Search .................... 43/17.5, 54.1, 43/57.1, 4; 206/315.11; 362/154

[56] References Cited

U.S. PATENT DOCUMENTS

| | | | |
|---|---|---|---|
| 2,517,914 | 8/1950 | Nowaczek | 240/6.4 F |
| 2,751,489 | 6/1956 | Cole | 43/54.1 |
| 3,938,132 | 2/1976 | Cunningham | 43/4 |
| 4,697,379 | 10/1987 | McPaul | 43/54.1 |
| 5,333,408 | 8/1994 | Simmons | 43/57.1 |
| 5,459,648 | 10/1995 | Courtney | 362/154 |

*Primary Examiner*—Kurt Rowan
*Attorney, Agent, or Firm*—Kokjer, Kircher, Bowman & Johnson

[57] ABSTRACT

A fishing tackle box has a built in light for use in night fishing. The tackle box has a main body, a hinged lid and three fold-out trays. The light is carried on the end of a flexible arm which allows the light to be adjusted to the desired position and orientation. The arm and light may be stored in a trough in the upper tray of the tackle box. In the storage position, the light aligns with an opening in the end of the lid so that when the tackle box is closed and is being carried, the light shines through the opening.

16 Claims, 2 Drawing Sheets

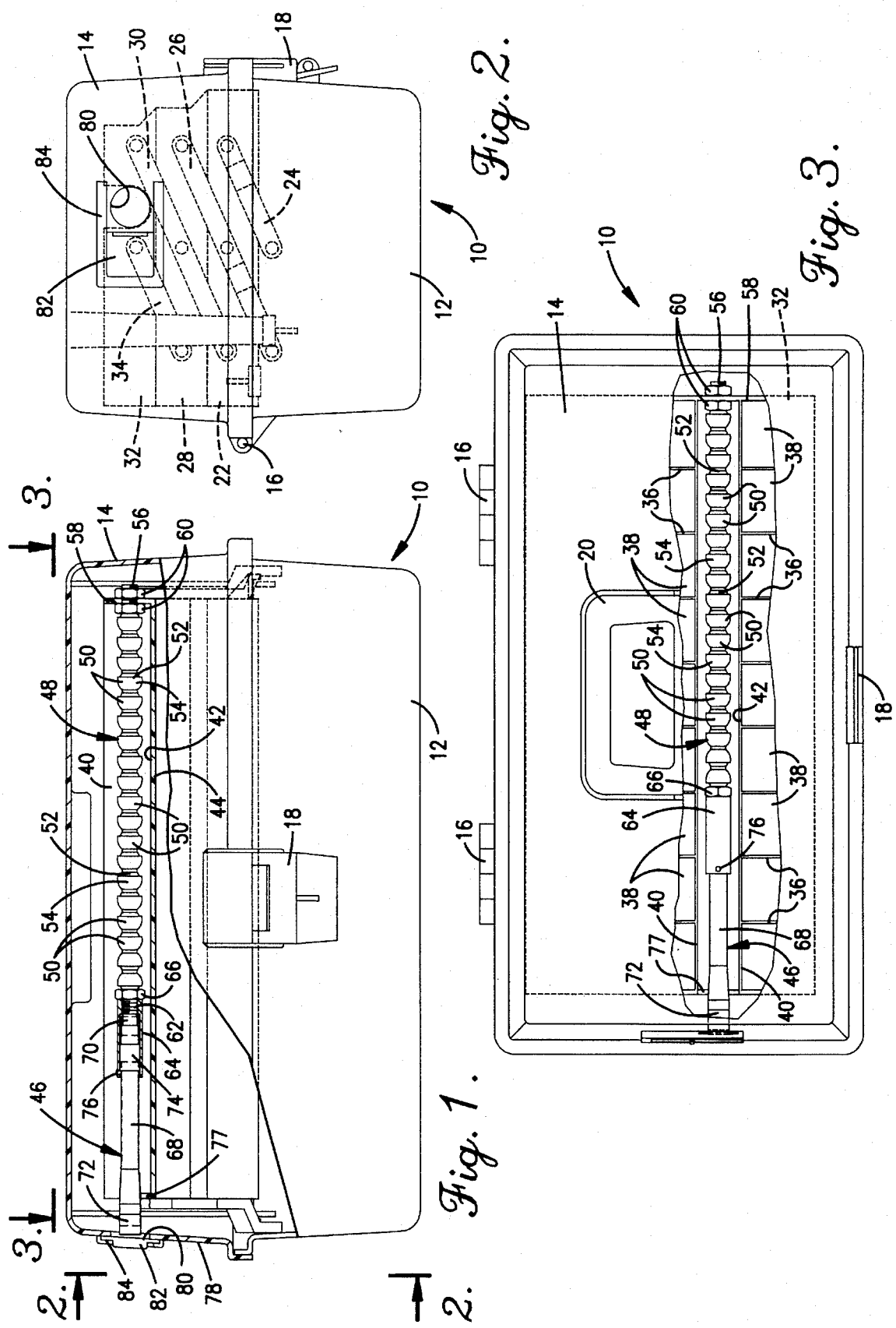

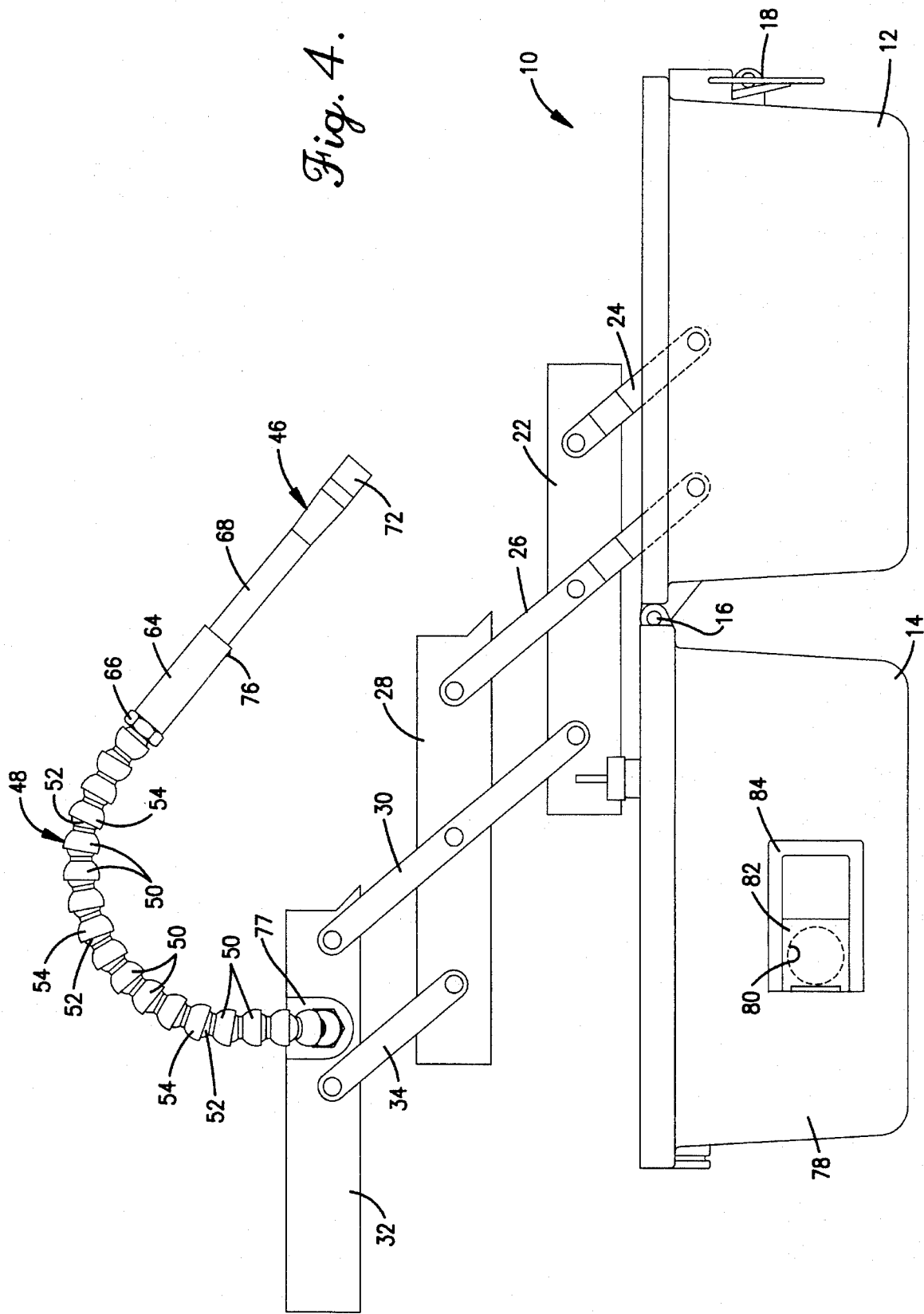

TACKLE BOX HAVING BUILT IN LIGHT

FIELD OF THE INVENTION

This invention relates generally to fishing tackle boxes and more particularly to a tackle box that is equipped with a built in light to provide illumination for night fishing.

BACKGROUND OF THE INVENTION

Lures, sinkers and other fishing articles are typically carried in a tackle box which may have several trays as well as the main box area for storage of various items. During fishing at night or at other times when the ambient light is inadequate, it is necessary for an artificial light to be used to locate desired articles in the tackle box, to bait hooks, and to carry out other activities. Normally, a flashlight is used. However, the work that must be performed often requires both hands. Consequently, the flashlight must be held in the mouth, held under one arm, laid down, or used in some other awkward way making it difficult to maintain the light aimed at the proper location. It is thus frequently difficult to provide proper lighting for the types of things that are involved in fishing at night.

SUMMARY OF THE INVENTION

The present invention is directed to a tackle box having a built in light that can be used effectively during night fishing. The invention is characterized by a mounting arm for the light that is flexible and adjustable to allow the light to be positioned where desired, aimed at the desired location, and reliably maintained in a stationary position. At the same time, the light can be stored in a compact position within the tackle box when it is not needed. The invention also features an opening in the end wall of the tackle box lid through which the light can be directed when the tackle box is closed. This permits the light to be used in the manner of a flashlight without occupying an additional hand of the user, as the tackle box and light are held together in one hand.

In accordance with the invention, a conventional three tray tackle box has a trough formed in the upper tray between its opposite ends. One end of a flexible mounting arm is secured to the upper tray at one end of the trough. The other end of the arm carries a small flashlight unit. The arm and light can be stored in the trough where they are out of the way.

When the tackle box is open, the arm can be pulled out of the trough and adjusted as desired to locate and aim the light either into the box or at another place where light is needed. The arm is constructed of link elements which are connected through ball and socket joints so that the arm can be bent into virtually any shape in order to properly aim the light. The ball and socket connections are tight enough to maintain the arm in any shape and orientation to which the user manipulates it. This assures that the light will be held steady by the arm.

The end wall of the lid has a small window opening located in alignment with the light when the lid is closed and the light and arm are stored in the trough. Thus, the light can be turned on so that it is directed out of the tackle box through the opening to illuminate the area ahead of the user while he is walking, for example. This eliminates the need for a separate flashlight and maintains one hand of the user free to carry a fishing pole or other equipment.

DESCRIPTION OF THE DRAWINGS

In the accompanying drawings which form a part of the specification and are to be read in conjunction therewith and in which like reference numerals are used to indicate like parts in the various views:

FIG. 1 is a front elevational view of a tackle box that is equipped with a built in light in accordance with a preferred embodiment of the present invention, with the tackle box closed and portions broken away and shown in section for purposes of illustration;

FIG. 2 is an end elevational view of the tackle box taken generally along line 2—2 of FIG. 1 in the direction of the arrows, with internal components shown in broken lines;

FIG. 3 is a top plan view of the tackle box taken generally along line 3—3 of FIG. 1 in the direction of the arrows, with a portion of the lid broken away for purposes of illustration; and FIG. 4 is a side elevational view similar to FIG. 1, but showing the tackle box in the fully open position with the built in light set up for use.

DETAILED DESCRIPTION OF THE INVENTION

Referring now to the drawings in more detail, numeral 10 generally designates a fishing tackle box which has a conventional construction for the most part. The tackle box 10 has a generally rectangular main body 12 which forms the base of the tackle box and which serves to contain relatively large fishing articles that are stored and carried in the box. The body 12 is hollow.

Along its back edge, the main body 12 of the tackle box is connected with a lid 14 by suitable hinge connections 16. The lid 14 is generally rectangular and can be swung about the hinge axis between the fully closed position shown in FIG. 2 and the fully open position shown in FIG. 4. In the closed position, the lid 14 overlies the body 12 and encloses the articles contained in the body. The lid 14 may be latched in the closed position by a latch 18. A handle 20 is provided on the top of the lid 14 to facilitate carrying of the tackle box.

The tackle box 10 is equipped with a bottom tray 22 which is connected with the body 12 by links 24 and 26. Each link 24 and 26 is pivoted to the body 12 and to the tray 22. Each link 26 is extended and pivotally connects at its top end with an intermediate tray 28. Additional links 30 are pivotally connected with the lower tray 22 and the intermediate tray 28, and the links 30 are parallel to links 26. Each of the links 30 is extended and connects pivotally at its top end with an upper tray 32. A shorter link 34 is pivoted to tray 28 at its lower end and to the upper tray 32 at its upper end.

Due to the parallel link arrangement by which the trays 22, 28 and 32 are mounted, the trays pivot together between the positions shown in FIG. 2 and 4. When the lid 14 is moved to the closed position, the trays are pivoted to a storage position (see FIG. 2) in which they are stored within the lid and directly overlie one another in a compact storage arrangement. When the lid 14 is pivoted to the open position shown in FIG. 4, the trays are unfolded to the position shown in FIG. 4. In this position, the trays are offset or staggered so that their contents are accessible. The construction and mounting of the trays is conventional and is well known in the industry.

With reference now to FIG. 3 in particular, the upper tray 32 is provided with partitions 36 which divide the interior of the tray into a number of compartments 38 in which fishing lures, hooks, sinkers and other small fishing articles can be stored. The bottom and intermediate trays 22 and 28 are also preferably partitioned in order to present compartments for storing fishing items. Each tray is open at the top.

With continued reference to FIG. 3 in particular, the upper tray 32 is provided with a pair of partitions 40 which extend parallel to one another along the entire length of the upper tray 32 in order to provide a trough 42 in the upper tray. The partitions 40 form opposite sides of the trough 42, while the bottom of the trough is formed by the horizontal bottom panel 44 (see FIG. 1) of the upper tray 32.

A flashlight unit which is generally identified by numeral 46 is carried on the end of a flexible and adjustable mounting arm 48. The flashlight unit 46 and mounting arm 48 may be stored in the trough in the storage position shown in FIGS. 1 and 3.

The mounting arm 48 is constructed of a plurality of individual links 50 which are connected with one another end to end. Each link 50 has a ball 52 on one end and a socket 54 on the other end. The balls 52 of the links fit closely in the sockets 54 of the adjacent links, thus providing a ball and socket connection between each pair of adjacent links. Because the balls 52 fit snugly in the sockets 54 and can swivel in them, the arm 48 can be flexed into virtually any shape that is desired. The close fit between the balls and sockets maintains the arm in the particular configuration to which it is manipulated.

As shown particularly in FIGS. 1 and 3, a threaded stud 56 has a ball on one end which is fitted in the socket of the first link 50 of the arm 48. The stud 56 extends through an opening in one end wall 58 of the upper tray 32 at one end of the trough 42 and is secured to the wall 58 by a pair of nuts 60 which are threaded onto the stud. This connects the arm 48 to the upper tray 32.

The opposite end of the arm 48 has another threaded stud 62 having a ball on one end which is fitted in the socket of the endmost link 50 in the arm 48. The study 62 is threaded into a sleeve 64 and secured by a nut 66.

The flashlight 46 has a tubular body 68 which houses batteries for operating the light. One end of the body 68 is fitted in sleeve 64. A push button switch 70 projects from the end of the body 68 and may be depressed alternately to energize and deenergize the bulb (not shown) which is located within the flashlight head 72 on one end of body 68. The body 68 can slide within sleeve 64 in order to depress the button 70 by forcing it against the end of the stud 62. A portion of the body 68 located within the sleeve 64 is provided with an enlarged collar 74. A pin 76 is secured through an opening in the sleeve 64 to provide a stop preventing the flashlight unit 46 from being separated from the mounting sleeve 64. The collar 74 is engaged against the pin 76 to limit movement of the body 60 out of the sleeve 64. At the same time, the body can slide within the sleeve sufficiently to alternately depress the push button 70 to turn the flashlight on and off.

As previously indicated, the flashlight 46 and mounting arm 48 are located in the trough 42 in the storage position. The end of the trough 42 opposite the end wall 58 is open as indicated by numeral 76. When the flashlight is in the stored position, its head 72 which contains the bulb and lens of the flashlight projects through the opening 76 and is located adjacent to an end wall 78 of the lid 14. A window opening 80 is formed through the wall 78 at a position in direct alignment with the flashlight head 72 when the arm and flashlight are in the storage position in the trough 42. As best shown in FIG. 4, a sliding door 82 is mounted on the outside surface of the lid end wall 78 in a frame 84. The door 82 can be slid back and forth in order to fully expose the opening 80 in the open position of the door and to block the opening 80 in the closed position of FIG. 4.

In use of the tackle box 10, the items that are stored in the body 12 and the trays 22, 28 and 32 may be carried with the lid in the closed position. The tackle box may be opened when access to the fishing items is desired. When the tackle box is in the open position shown in FIG. 4, the flashlight 46 and mounting arm 48 may be removed from the trough 42 for use of the flashlight to provide adequate illumination during night fishing activities and during other conditions when the ambient light is inadequate. Because of the flexible and adjustable construction of the mounting arm 48 and its ability to maintain the configuration to which it is manipulated, the light may be positioned in virtually any desired location and may be aimed in the desired direction. For example, FIG. 4 shows the light aimed generally toward the body 12 to facilitate locating items that are stored therein.

When the light is no longer needed, it can be placed back in the trough 42 along with the mounting arm 48 in the storage position. It is noted that the light is directed out of the tackle box through the opening 80 when the light is in the storage position and the lid 14 is closed. Consequently, the user can keep the light on when the tackle box is closed in order to provide illumination through the opening 80. Thus, when the user is walking at night, the flashlight provides illumination ahead of him in the same manner as a flashlight held in the hand. However, both the tackle box and the light 46 are held together in one hand, so the other hand of the user remains available to carry fishing poles and other equipment.

When the light 46 is not needed, it can be turned off by sliding it into the sleeve 64 in order to depress the push button 70. The door 82 can be closed over the opening 80 when the opening is not needed to transmit illumination from the light.

It is thus apparent that the present invention provides a tackle box having a built in light source which is useful during night fishing and which avoids the need for the user to carry a separate flashlight or other source of light. In addition to being useful when the tackle box is open and various fishing articles are being located within the tackle box, the light is also useful when the tackle box is closed and is being carried from place to place, as the light can be directed through the opening 80 for this purpose.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described the invention, what is claimed is:

1. In a fishing tackle box having a box structure which includes a body, a lid for the body having open and closed positions and at least one storage tray enclosed in the body and lid in the closed position of the lid, the improvement comprising:

a light operable to emit light when energized;

an elongate flexible arm connected with said box structure at one end and with said light at the other end to mount the light to the box structure, said arm having a storage position wherein said arm and light are stored within said box structure when the lid is in the closed position and said arm being extensible out of the box structure when the lid is in the open position to support the light at a plurality of selected positions and orientations; and a window opening in said box structure aligned with said light in the storage position of said arm to allow the light to be energized for emitting light through said opening when the lid is in the closed position.

2. The improvement of claim 1, including means for selectively closing said window opening.

3. The improvement of claim 1, wherein:

said arm is connected at said one end thereof to said tray; and said tray presents a trough in which said light and arm are stored in the storage position.

4. The improvement of claim 3, wherein said lid has a wall presenting said window opening therein.

5. The improvement of claim 4, wherein said arm includes a plurality of individual links arranged end to end with each link having a ball and socket connection with each adjacent link.

6. The improvement of claim 1, wherein:

said lid has a hinge connection to said body;

said box structure includes second and third trays;

said one tray and said second and third trays are connected to each other and to said body and lid in a manner to make each tray accessible when the lid is in the open position and to enclose each tray within the lid in the closed position thereof;

said one tray overlies said second tray in the closed position of the lid;

said second tray overlies said third tray in the closed position of the lid; and said arm is connected at said one end thereof to said one tray.

7. The improvement of claim 6, wherein:

said one tray presents a plurality of compartments for holding fishing equipment; and said one tray presents a trough in which said arm and light are stored in the storage position of the arm.

8. The improvement of claim 7, wherein said lid has a wall presenting said window opening therein.

9. The improvement of claim 6, wherein said lid has a wall presenting said window opening therein.

10. The improvement of claim 1, wherein said arm includes a plurality of individual links arranged end to end with each link having a ball and socket connection with each adjacent link.

11. A fishing tackle box comprising:

a hollow body for holding fishing equipment;

a lid having a hinge connection with said body to permit the lid to be opened and closed;

at least one tray enclosed within the body and lid when the lid is closed, said tray being accessible when the lid is opened and being constructed to hold fishing accessories;

a light operable to emit light when energized;

flexible arm means having one end connected with said tray and another end connected with said light for mounting of the light to the tray, said arm means having a storage position wherein the arm means and light are stored in the tray and said arm means being flexible to permit displacement of the light out of the tray for support of the light at a variety of positions and orientations; and a wall of said lid presenting a window opening located in alignment with said light when the lid is closed and said arm means is in the storage position.

12. A tackle box as set forth in claim 11, wherein:

said tray has a plurality of compartments for holding fishing equipment; and said tray presents a trough in which said arm means and light are stored in the storage position.

13. A tackle box as set forth in claim 12, wherein said arm means comprises an elongate arm which includes a plurality of individual link elements arranged end to end and connected together by ball and socket means allowing each link element to swivel relative to each adjacent link element for adjustment of the arm.

14. A tackle box as set forth in claim 11, wherein said arm means comprises an elongate arm which includes a plurality of individual link elements arranged end to end and connected together by ball and socket means allowing each link element to swivel relative to each adjacent link element for adjustment of the arm.

15. A fishing tackle box comprising:

a hollow body for holding fishing equipment;

a lid connected with said body for hinged movement between an open position wherein the interior of said body is accessible and a closed position wherein the contents of said body are enclosed;

at least one tray having a plurality of compartments for holding fishing equipment, said tray being connected with said body and lid in a manner exposing said compartments when the lid is in the open position and enclosing said tray within the lid and body when the lid is in the closed position;

an elongate trough in said tray;

a light operable to emit light when energized;

a flexible arm having one end connected with said tray and another end carrying said light thereon, said arm being constructed in a manner to accommodate flexing thereof to a variety of positions and to maintain each of said positions to locate the light at a variety of working positions, said arm having a storage position wherein the arm and light are stored in said trough; and a wall of said lid presenting a window opening located in alignment with the light in the storage position of said arm when the lid is in the closed position.

16. A tackle box as set forth in claim 15, wherein said arm comprises a plurality of individual link elements arranged end to end and connected together by ball and socket means allowing each link element to swivel relative to each adjacent link element for adjustment of the arm.

* * * * *